United States Patent [19]
Frenken

[11] Patent Number: 5,924,536
[45] Date of Patent: Jul. 20, 1999

[54] TORQUE-SWITCHED CLUTCH

[75] Inventor: Egbert Frenken, Heinsberg, Germany

[73] Assignee: Gustav Klauke GmbH, Remscheid, Germany

[21] Appl. No.: 08/902,134

[22] Filed: Jul. 30, 1997

[30] Foreign Application Priority Data

Aug. 1, 1996 [DE] Germany .......................... 196 31 065
May 16, 1997 [DE] Germany .......................... 197 20 699

[51] Int. Cl.$^6$ ...................................... F16D 7/04
[52] U.S. Cl. .............................. 192/56.1; 192/71; 464/37
[58] Field of Search ...................... 192/56.1, 56.5, 192/56.51, 37, 71; 464/37

[56] References Cited

U.S. PATENT DOCUMENTS

| | | | |
|---|---|---|---|
| 924,749 | 6/1909 | Drapier | 464/37 |
| 1,920,017 | 7/1933 | McClatchie | 192/56.5 |
| 2,253,466 | 8/1941 | Grohn | 192/56.5 |
| 3,762,183 | 10/1973 | Bollinger | 464/37 X |
| 4,848,547 | 7/1989 | Kampf | 192/56.5 X |

*Primary Examiner*—Richard M. Lorence
*Attorney, Agent, or Firm*—Trexler, Bushnell, Giangiorgi & Blackstone, Ltd.

[57] ABSTRACT

In a torque-switched clutch between an input shaft and an output shaft, the clutch transferring into a release position from a positive-locking connection when a limiting torque is reached, at least one positive-locking element is connected to one of the shafts. The positive-locking element interacts with a positive-locking receiver of the other shaft. The positive-locking element is movable against a force out of a coupling position into a release position in a non-destructive manner. The positive-locking element is of latch type design and is mounted on the one shaft so as to be pivotable relative to that shaft for movement between a latch locking position and a latch overrun position.

35 Claims, 10 Drawing Sheets

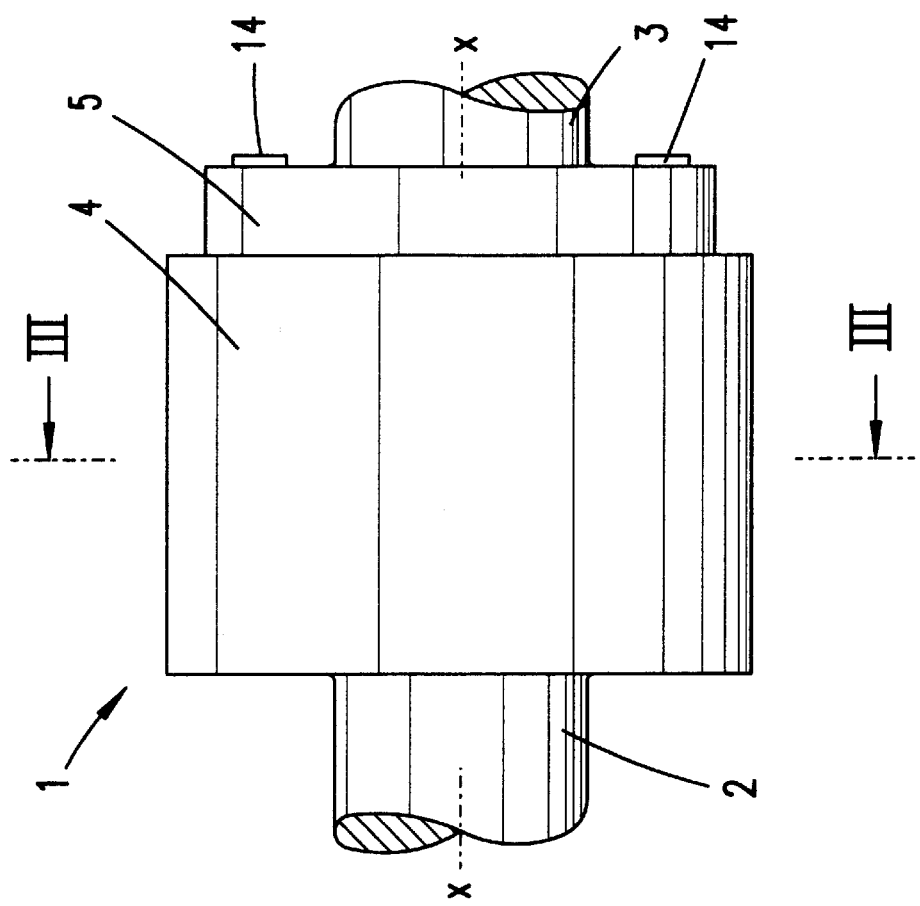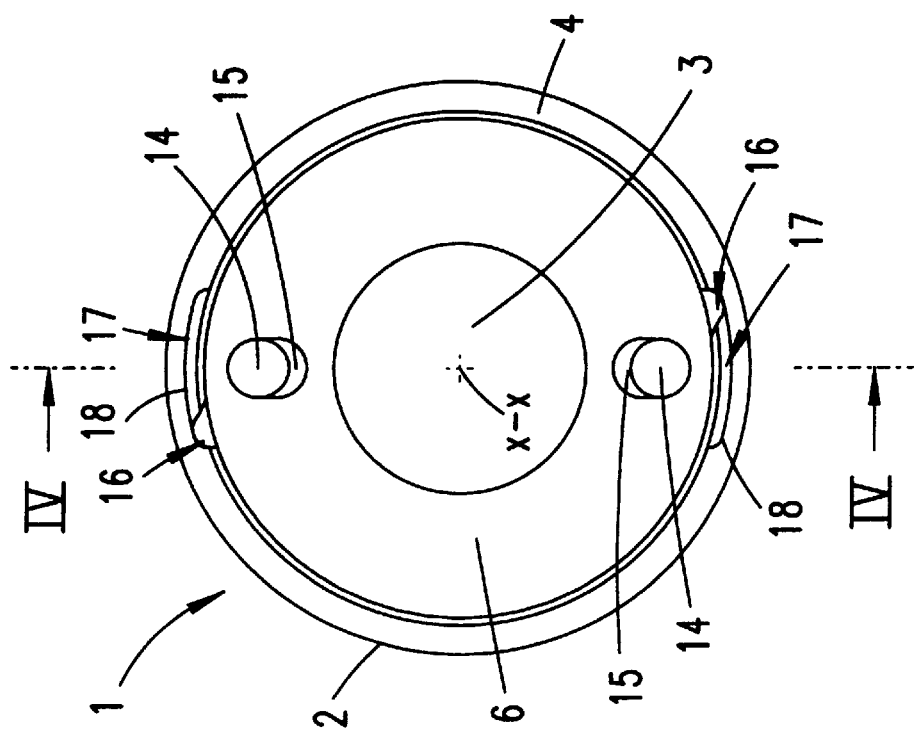

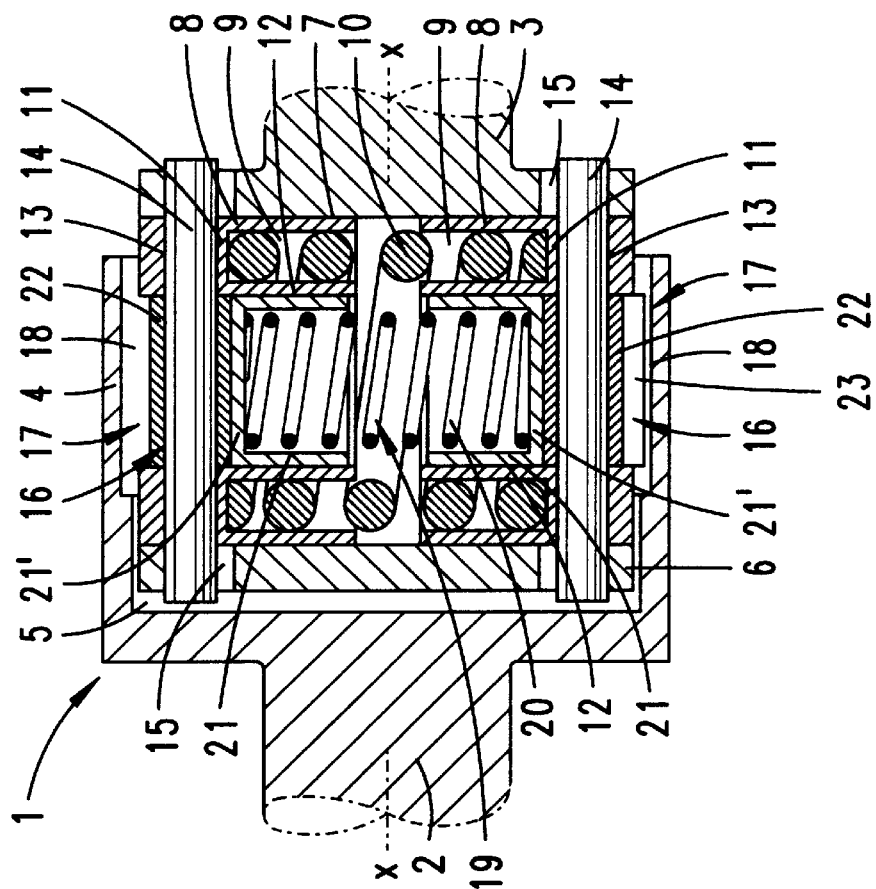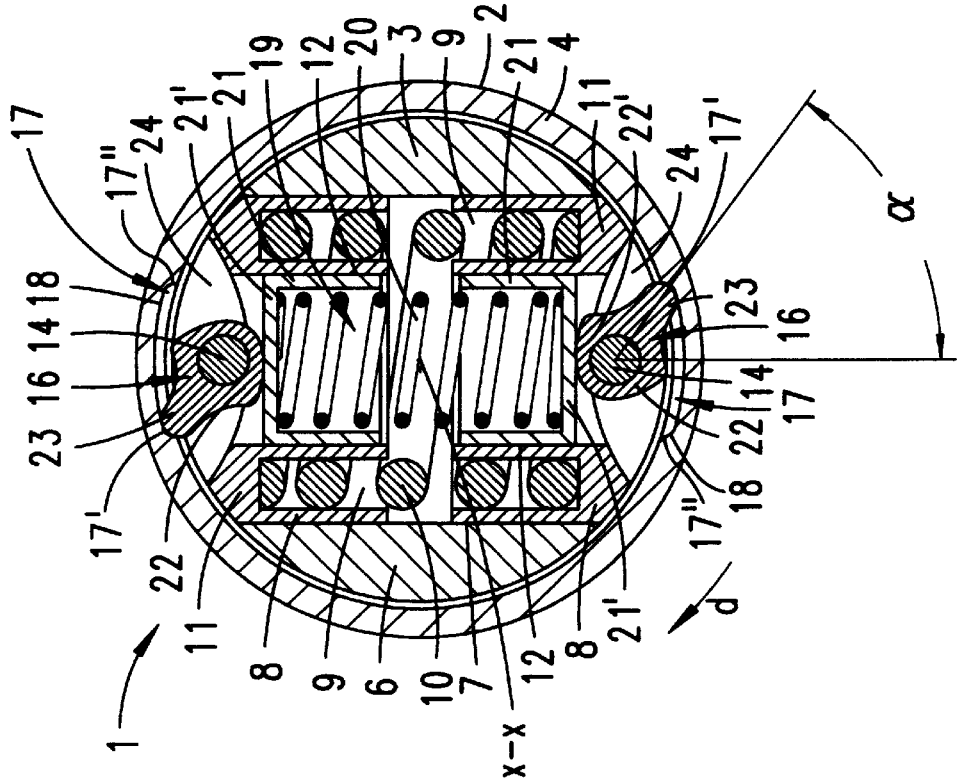

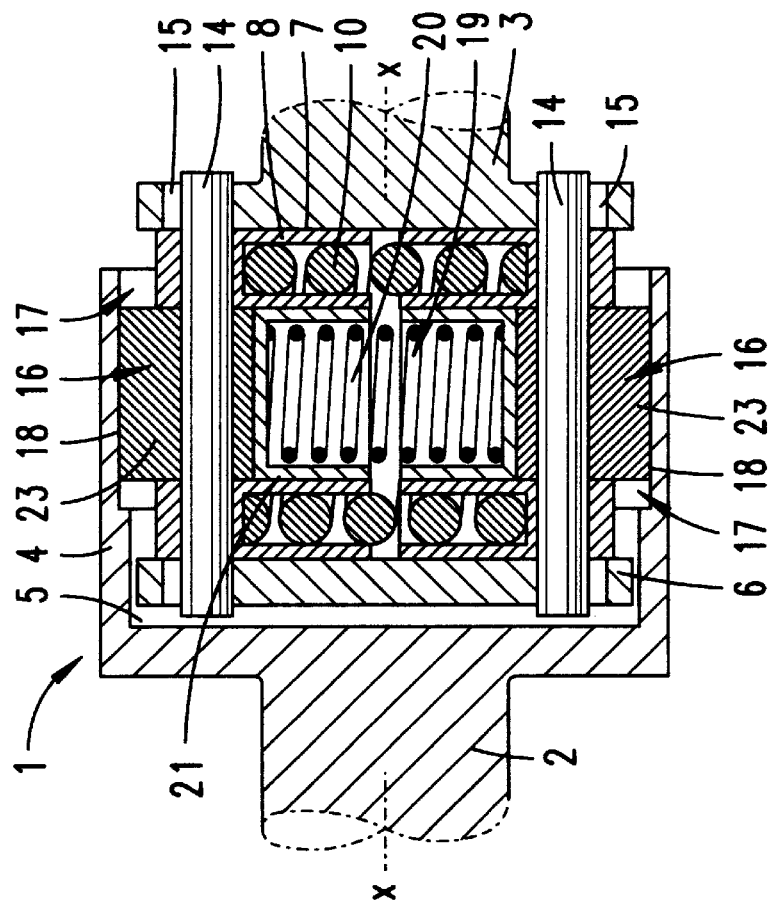
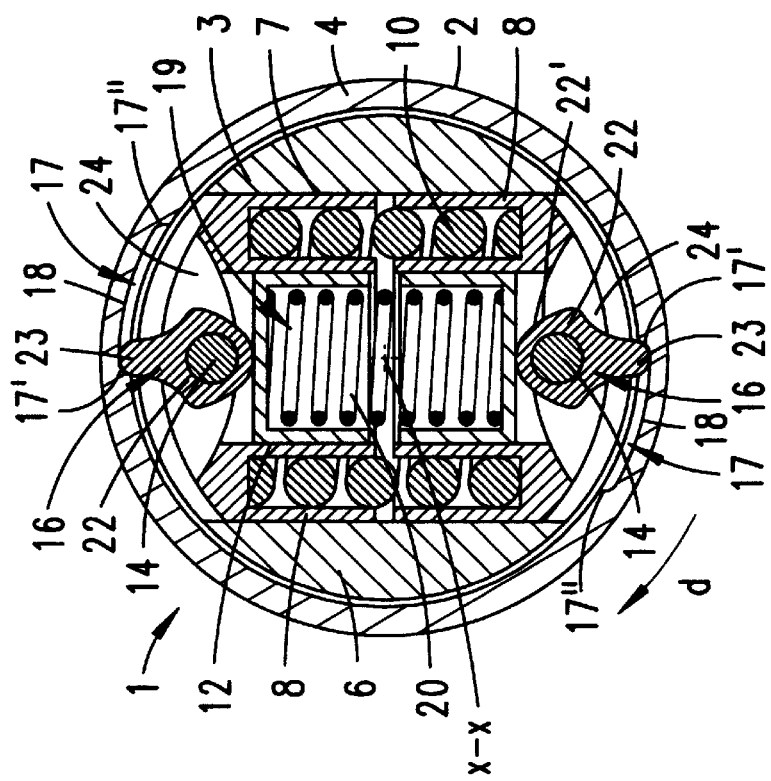

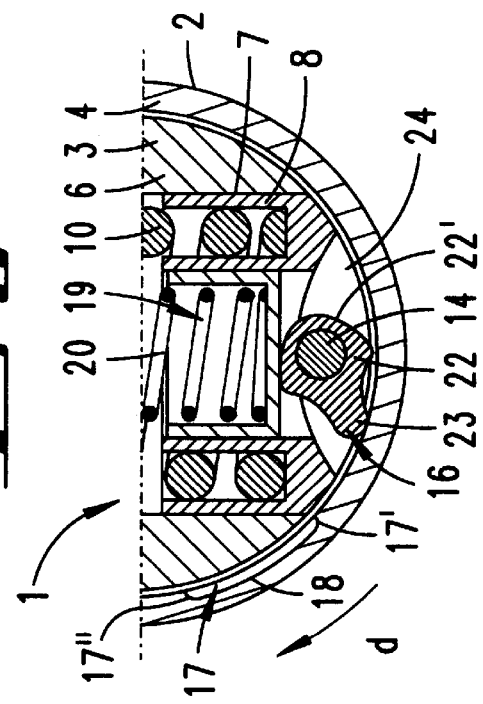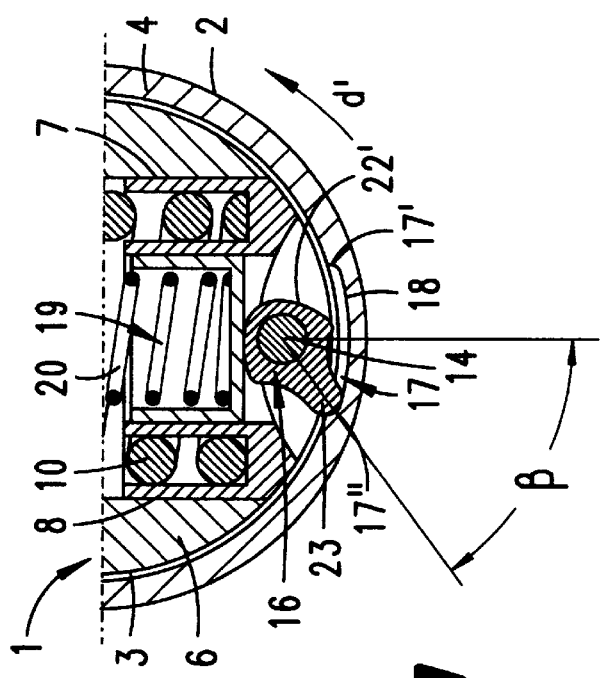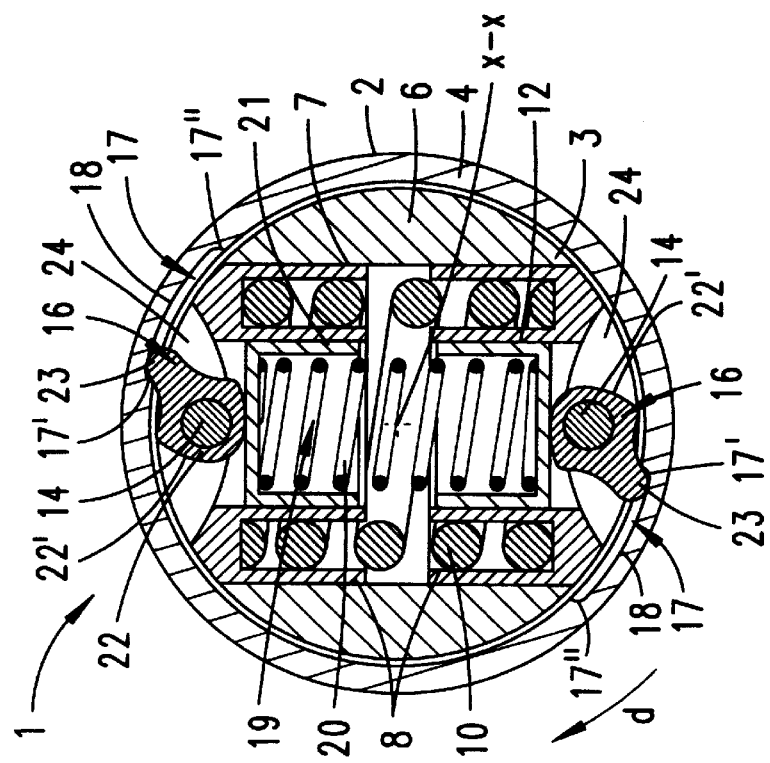

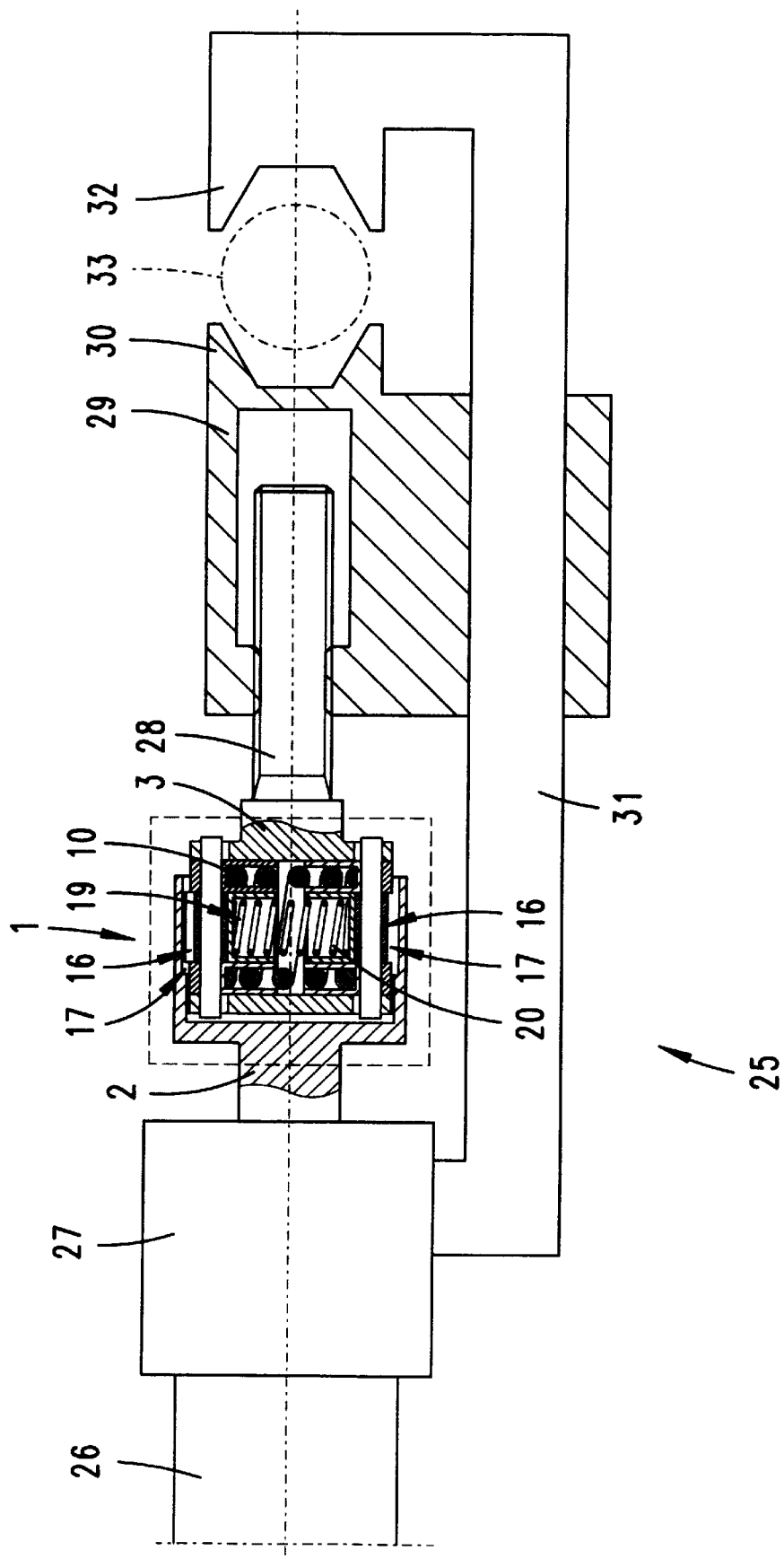

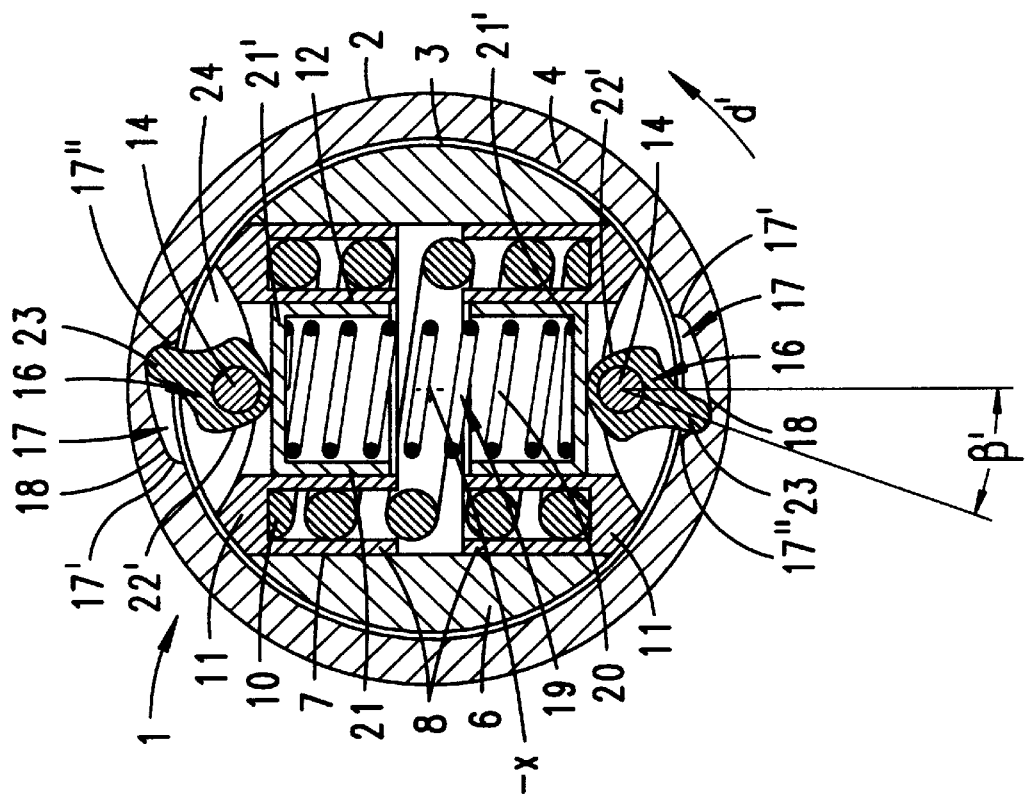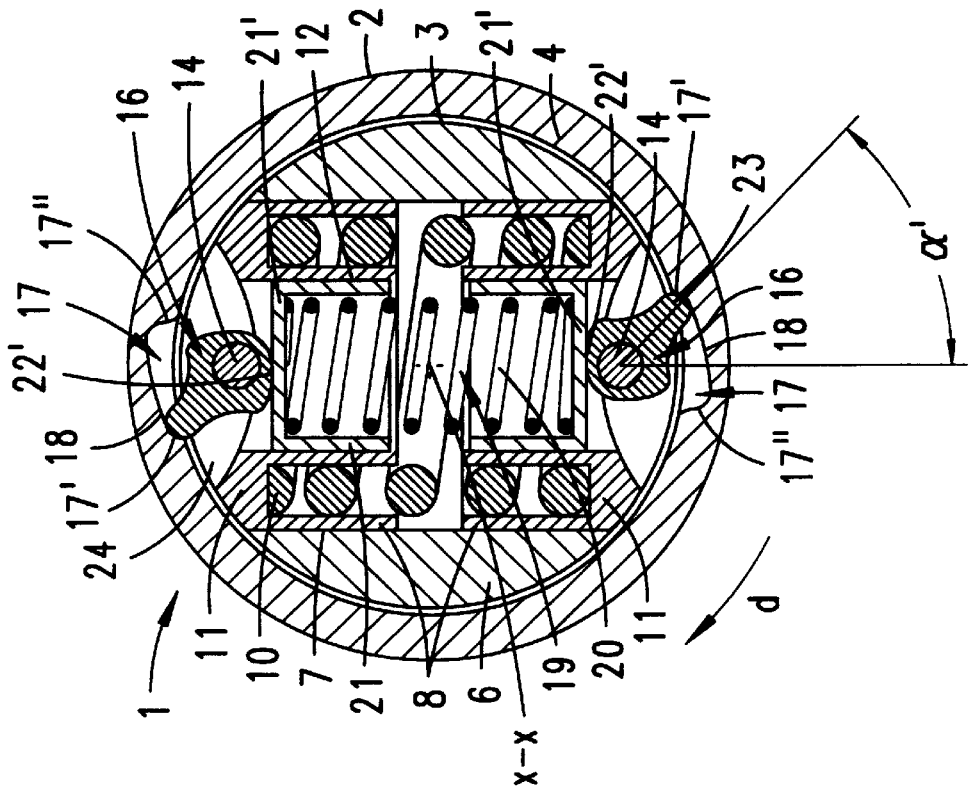

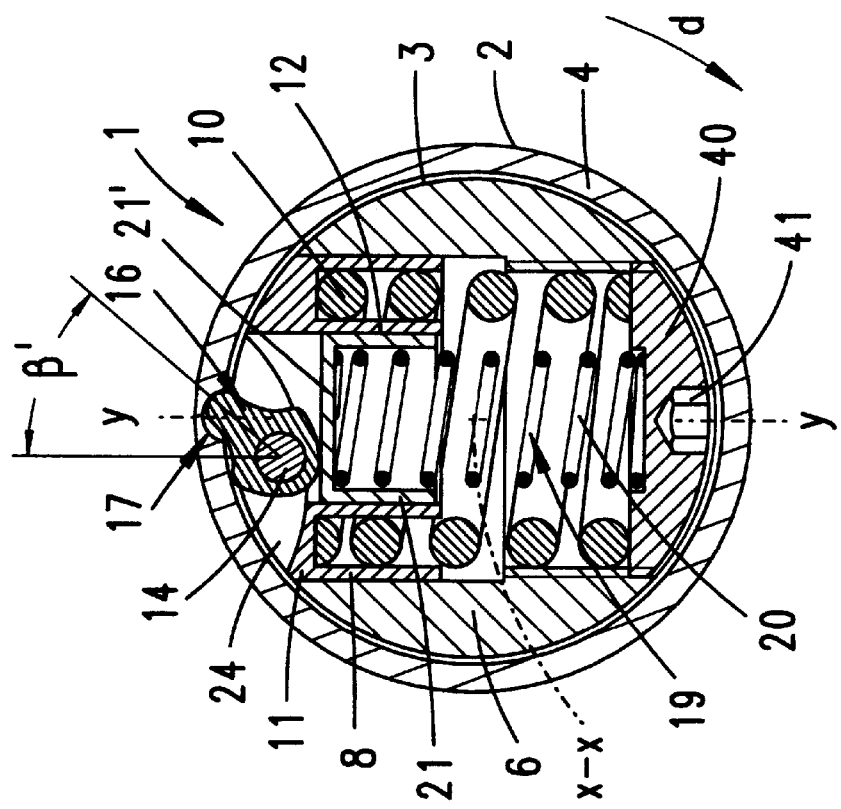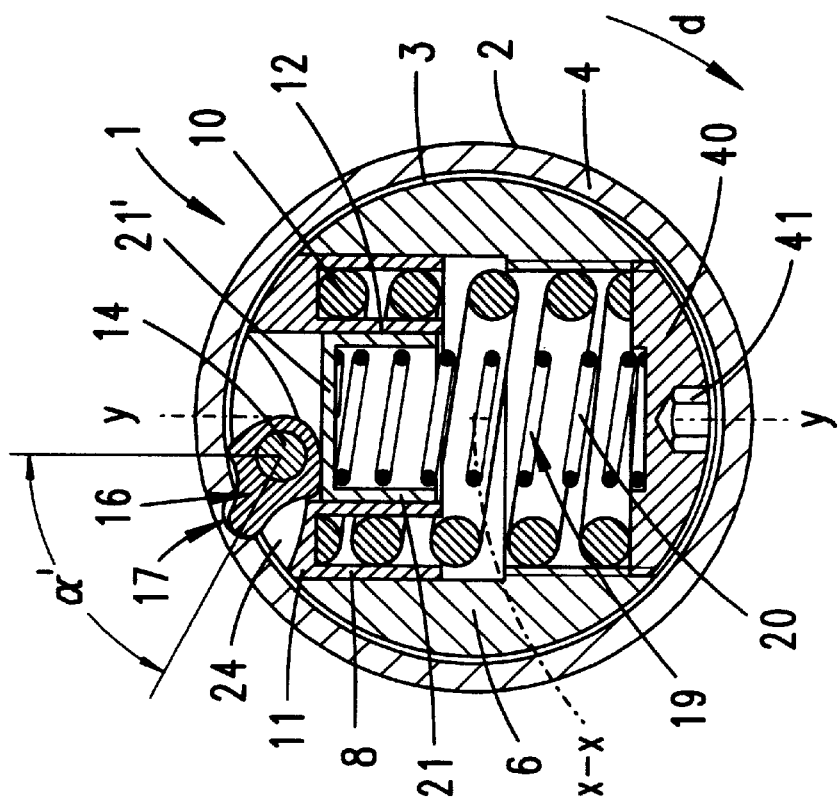

TORQUE-SWITCHED CLUTCH

BACKGROUND OF THE INVENTION

1. Field of the Invention

The invention relates to a torque-switched clutch between an input shaft and an output shaft, which transfers into a release position from a positive-locking connection when a limiting torque is reached, the clutch comprising at least one positive-locking element, which is connected to one shaft and interacts with a positive-locking receiver of the other shaft, the positive-locking element being movable against a force out of a coupling position into a release position in a non-destructive manner.

2. Description of the Prior Art

Torque-switched clutches of this kind are known in the form of friction-locking or positive-locking overload clutches. From a certain limiting torque onwards, the friction-locking overload clutches slip, as a result of which the fixed connection between the coupled shafts is interrupted and a further rise in the torque is prevented. In the positive-locking designs, the torque is transmitted by interengaging parts of the clutch halves. When the limiting torque is reached, the clutch disengages. A torque-switched clutch of this kind is known, for example, from German Published Patent Application No. 2,720,549, in which a description is given of a torque-regulating device in which the coupling position is defined by balls associated with the input shaft and the output shaft, these balls being brought into engagement with one another. When the limiting torque is reached, the clutch-forming balls associated with one of the shafts move back, the movement taking the form of a relative axial displacement, such that the balls associated with the other shaft slide over these deflected balls. The receivers located between the individual balls of one shaft, which ensure positive locking in the coupling position, have the effect of a continuous engagement and disengagement, in the position in which the limiting torque is exceeded, as soon as the balls of one of the shafts have slid over the balls of the other shaft, which have moved back against a spring force. One disadvantage of this and the other known clutch designs is that the connection is not continuously interrupted after the limiting torque has been reached. In the case of the friction-locking slipping clutch, the slipping torque acts continuously. In the case of the positive-locking designs, as already described, there is continuous engagement and disengagement. As a result, high friction and severe wear occur in the clutch.

BRIEF SUMMARY OF THE INVENTION

As regards the prior art described above, a technical problem for the invention is seen in providing a torque-switched clutch which is distinguished by improved ease of handling and/or lower friction and reduced wear once the limiting torque is exceeded.

This problem is solved initially and substantially by the subject of claim 1, it being provided that the positive-locking element is of latch-type design and is arranged so as to be rotatable relative to the one shaft for movement between a latch locking position and a latch overrun position. As a result of this configuration, an overload clutch is provided which almost completely separates the shafts once the disengagement torque or limiting torque is exceeded. The arrangement is thus chosen such that latch-type positive-locking elements are used, of the type known, for example, from the known switchable ratchet spanners or wrenches. According to the invention, the latch-type positive-locking element is displaced, when the limiting torque is exceeded, from a latch locking position, i.e. a driving position, into a latch overrun position, in which the two shafts are separated completely from one another.

In this release position, the positive-locking receiver of the one shaft overruns the positive-locking element in the manner known from the known ratchet spanners when there is a reverse movement counter to the chosen direction of driving. The configuration according to the invention of a clutch with a positive-locking element which can be pivoted out in a definitive manner may thus be employed in various fields including, for example, with a ratchet spanner or the like to form a ratchet spanner with torque control. This provides the possibility, with a ratchet spanner for example, of tightening a bolt or the like with a predetermined torque, switching of the positive-locking element into an overrun position enabling the spanner to run free when the limiting torque is exceeded. Depending on the direction of rotation set, a ratchet spanner of this kind provided with torque control may be used both with left-handed and right-handed bolts or the like. When a clutch provided with the latch-type positive-locking element according to the invention is used in the drive train of a mechanical press tool, for example, there is a further advantage in that opening, i.e. reverse rotation of the press tool, is only possible once the minimum pressing force has been reached, i.e. after the disengagement of the clutch. Before this minimum pressing force is reached, the clutch acts as a freewheel in the reverse direction. This characteristic ensures that the pressing operation cannot be ended prematurely. Accordingly, a pressing force corresponding to the disengagement element is achieved in each pressing operation.

The clutch according to the invention may also be employed for force limitation in other tools which involve the application of torque. Thus, for example, torque spanners for tightening bolts or the like with a predetermined torque may be provided with a clutch of this kind. Use of the clutch according to the invention is also conceivable, for example, on machines with a downstream roller transmission as used, for example, for pressing tubes in the sanitary sector, or on any other machines without a spindle drive. In an advantageous development of the subject-matter of the invention, provision is made for the positive-locking element to adopt the release position in such a manner that the release position is maintained even in the case of failure of the torque and that, in the release position, the positive-locking element interacts with the mating shaft in a manner at least substantially free from torque. This means in essence that the force acting on the positive-locking element in the sense of a radial raising movement is smaller by several orders of magnitude than the total force acting radially outwards on the positive-locking element. It is furthermore proposed that the positive-locking element be provided on the output shaft. Accordingly, the positive-locking element interacts with a positive-locking receiver on the input shaft. As an alternative, it is also conceivable to provide the positive-locking element on the input shaft and the positive-locking receiver on the output shaft. Provision is furthermore made for the output shaft to be arranged concentrically with the input shaft in the region of the clutch. In this arrangement, a positive-locking element may be located to the outside of the circumferential surface of the output shaft to interact with a positive-locking receiver on the inner wall of the circumferential surface of the input shaft. However, it is also possible to conceive of embodiments in which the ends of the shafts lie opposite one another in the region of the clutch, with the two shafts aligned coaxially relative to one another.

In this arrangement, the positive-locking element is provided at the end of the one shaft to interact with a positive-locking receiver formed in the region of the end face of the other shaft. A configuration is preferred in which the input shaft has a positive-locking recess facing the output shaft. In an advantageous development of the subject-matter of the invention, it is provided that the positive-locking element is arranged in the output shaft in such a way as to be able to yield radially inwards against an applied force. The magnitude of the releasable force applied is directly proportional to the desired limiting torque specified. The disengagement point of the clutch may be predefined by specifying the force applied to the positive-locking element. Once the limiting torque is reached, the positive-locking element is deflected radially inwards in the output shaft, against the applied force, and, by virtue of the rotatable arrangement, moves from the latch locking position into the latch overrun position. A configuration is preferred in which the element which provides the applied force is formed by a preloaded first compression spring. By using different compression springs or by presetting the stress of the compression spring, it is possible to vary the setting of the clutch disengagement point. However, it is also possible to conceive of embodiments in which the clutch has neither an interchangeable nor an adjustable compression spring, thus providing the tool which has the clutch with a defined limiting torque. In an alternative embodiment, it is provided that the applied force is developed by hydraulic preloading. Accordingly, the positive-locking element is acted upon on the inside, i.e. radially outwards, by oil pressure. This provides the possibility of adjusting the disengagement torque by varying the oil pressure.

It is furthermore provided that a separate spring element, which acts on the positive-locking element, is provided in the one shaft. This acts in addition to the element described above which provides the applied force. Thus, for example, provision may be made for the spring element to effect a radial preload on the positive-locking element for engagement in the positive-locking recess. This gives rise to the particular advantage that the positive-locking element remains at all times in a secured latch locking position until the disengagement torque is reached. This also results in the advantage that, if the rotation of the input shaft is reversed before the disengagement torque is reached, at which torque the positive-locking element is overrun, and if the forward rotation of the input shaft is then resumed, the positive-locking element automatically locates the positive-locking recess in the input shaft to give the latch locking position. A configuration is preferred in which the spring element is a tension spring, the spring force effecting at all times a preload on the positive-locking element towards the position of the positive-locking element which has not been adopted. As an alternative to this, provision may be made for the spring element to be formed by a second compression spring acting substantially radially outwards on the positive-locking element. It is furthermore proposed that the positive-locking element may be movable relative to the one and the other shaft. For this purpose, it is possible, for example, for the latch-type positive-locking element to be pivotably mounted on a shaft, preferably the output shaft. In a preferred embodiment, the positive-locking element is arranged rotatably on a pivot for rotation from the latch locking position into the latch overrun position. By virtue of the configuration described above, it is possible to form an embodiment in such a way that the energy accumulator which effects the preloading of the positive-locking element acts directly on the positive-locking element, and the element which provides the applied force and against which the positive-locking element is arranged to be deflected radially inwards, acts on the pivot of the positive-locking element.

This counteracts wear of the positive-locking element, since the relatively high force applied, which is matched to the limiting torque, does not act directly on the positive-locking element but indirectly on it via its pivot. Provision is made for the pivot to extend substantially parallel to the shaft axis. It is furthermore proposed that the positive-locking recess should be of groove-like design. A configuration is preferred in which the groove-like positive-locking recess extends substantially parallel to the axis of the input shaft. It is furthermore proposed, for this purpose, that the groove should be larger in the axial direction of the shaft than the extent of the positive-locking element. The latch-type positive-locking element preferably has a finger-like configuration in cross-section. Longitudinally, i.e. in the axial direction of the shaft, in contrast, the latch-type positive-locking element takes the form of a long rectangular prism. In a preferred embodiment, it is provided that the groove is matched in the circumferential direction to the pivoting angle of the positive-locking element. The length of the groove, measured in the circumferential direction, thus preferably corresponds to the pivoting travel of the positive-locking element, the said travel being in the form of a sector of a circle. In an advantageous development of the subject-matter of the invention, it is provided that the positive-locking element is connected to a first cup element, which can be displaced in the output shaft substantially perpendicular to the shaft axis, the element applying a force to the positive-locking element being accommodated in the interior of the cup.

The connection between the first cup element and the positive-locking element is preferably effected in the region of the pivot carrying the positive-locking element. The first compression spring, which defines the disengagement torque, is for example located in the interior of the cup. For this purpose, it is further proposed that the positive-locking element is arranged outside a cup top in relation to the element which applies a force. This cup top forms, on the side facing away from the positive-locking element, the pressure surface for the element applying a force. Provision is furthermore made for the energy accumulator to be arranged substantially concentric with the first compression spring, which applies a force to the positive-locking element. Thus, it is possible, in the case where the energy accumulator is in the form of a second compression spring, for the said spring to be arranged within the first compression spring, concentrically with the latter. Where the energy accumulator is formed as a tension spring, it is aligned at a slight angular offset to the axis of the first compression spring in the latch locking position and in the latch overrun position. In a dead-centre position of the positive-locking element, the said position being between the latch locking position and the latch overrun position, the axis of the tension spring preferably extends concentrically with the axis of the first compression spring. It is further proposed that the second compression spring be provided in a further, second cup element. Direct preloading of the positive-locking element is effected via this second cup element. In a development of the subject-matter of the invention, it is provided that the first and the second cup element are arranged concentrically, the second cup element being displaceable in the radial direction relative to the first cup element. A configuration is preferred in which the radial deflection travel of the positive-locking element is stop-limited. This may be achieved, for example, by mounting the pivot which carries the positive-locking element in slotted recesses in the output shaft.

This configuration opens up the possibility of the outer wall of the output shaft being spaced apart from the inner wall of the input shaft in every position of the positive-locking element. This ensures that, when the limiting torque is exceeded, i.e. once the disengagement torque has been reached, a complete separation of the shafts has been achieved. Only the very small residual torque of the positive-locking elements pivoted in the freewheeling direction acts in this case. As already described, reverse rotation of the spindle when the clutch according to the invention is used in an electromechanical press tool with a spindle is only possible once the limiting torque has been exceeded and the latch-type positive-locking elements have pivoted over accordingly. For reasons of safety, however, it may also be necessary to reverse the pressing operation, once begun. To achieve this, it is possible to select an alternative configuration in which the radially outer stop of the positive-locking element is formed by support of the outer wall of the output shaft against the inner wall of the input shaft. This maintains a residual friction torque between the input shaft and the output shaft. This provides the possibility of reverse rotation of the spindle below a certain pressing force. This relatively low friction torque between the shafts is sufficient for a reverse rotation of the spindle. The disengagement torque is determined by the angle of incidence of the positive-locking element at the beginning of inward deflection against the element which applies a force. In an advantageous development of the subject-matter of the invention, it is proposed, for this purpose, that an angle of incidence of the positive-locking element is greater in a first position than the angle of incidence in a second position.

This makes possible relatively simple re-engagement of the clutch by means of an oppositely directed torque, it being possible for this torque to be considerably lower than the disengagement torque by virtue of the differing angles of incidence of the positive-locking element. There is thus the possibility of re-engaging the clutch according to the invention in a very simple manner by hand, when using it in a hand tool, by holding fast the output shaft and simultaneously rotating the input shaft in the reverse direction. In another configuration, to obtain a lower torque for the re-engagement of the clutch, the positive-locking element is arranged radially offset relative to the axis of the second cup element. By this means also, different angles of incidence are achieved in the two driving positions, thus making possible, here too, re-engagement of the clutch by means of an oppositely directed torque lower than the working torque. As regards its disengagement point upon reaching a maximum torque, the clutch according to the invention may be formed to be adjustable. For this purpose, it is proposed that the preloading force of the first compression spring be adjustable. As described, the latter acts upon the positive-locking element in the direction of the positive-locking receiver. By changing the preloading force of this first compression spring, it is a very simple matter to preset the maximum torque in a variable manner. For this purpose, provision is furthermore made for the adjustment of the preloading force of the first compression spring to be effected by means of an adjusting screw. The latter preferably forms a base for the support of the first compression spring. The adjustment is preferably performed, at the works or by the customer, simply by screwing the adjusting screw in or out. It is furthermore preferred to cover the adjusting screw, in the assembled state of the clutch, i.e. in the operating state, by means of the shaft section having the positive-locking receiver.

The adjusting screw is preferably of self-locking design. However, it may also be fixed by deformation of the material in the region of the thread, e.g. by centre punching. As an alternative, especially in the case where the adjusting screw is configured as a self-locking screw, provision may also be made for the adjustment to be carried out by the user. In this case, the outer shaft section having the positive-locking receiver has a corresponding window-like opening. This provides the user with a torque-switched clutch capable of variable settings. In a preferred embodiment of the subject-matter of the invention, two positive-locking elements arranged opposite one another are provided. Finally, it has proven advantageous if two cup elements oriented in opposite directions are provided. However, it is also possible to conceive of embodiments in which more than two positive-locking elements in the clutch are provided. For example, a number of pairs of positive-locking elements located opposite one another may be arranged offset relative to one another in the axial direction, each pair of positive-locking elements being associated with the energy accumulators described above, with the elements effecting the application of a force, and with the respective cup elements. A significant advantage of the configurations described above is found to be that the disengagement torque depends, for example, only on the preloading force of a first compression spring and geometrical variables. This makes it possible to maintain the disengagement torque more accurately than is possible with slipping clutches, owing to the severe fluctuations in the friction coefficients.

By virtue of its compact design, the clutch according to the invention may also be provided as a loose component. Such a loose component may thus be located between a socket spanner and a socket-spanner insert (socket nut), the clutch unit being provided on the input shaft with a square receiver for the socket spanner and on the output shaft with a square plug-in element for the socket-spanner insert.

BRIEF DESCRIPTION OF THE DRAWINGS

The invention is explained below with reference to the attached drawings, although these illustrate only exemplary embodiments. In the drawings:

FIG. 1 shows a torque-switched clutch according to the invention in an end view, relating to a first embodiment;

FIG. 2 shows a side view of the clutch;

FIG. 3 shows the section along the line III—III in FIG. 2, relating to positioning of the clutch in the direction of the arrow;

FIG. 4 shows the section along the line IV—IV in FIG. 1, relating to the position shown in FIG. 3;

FIG. 5 shows an illustration corresponding to FIG. 3, but in a dead-centre position of the clutch in the course of the limiting torque being exceeded;

FIG. 6 shows an illustration corresponding to FIG. 4, but relating to the position shown in FIG. 5;

FIG. 7 shows an illustration which follows on from FIG. 5, relating to a release position of the clutch after the limiting torque has been exceeded;

FIG. 8 shows a partial illustration corresponding to FIG. 7, but illustrating a position in the course of the overrunning of a positive-locking element of the clutch during rotation in the direction of the arrow;

FIG. 9 shows another partial representation corresponding to that in FIG. 7, but in the course of a reverse rotation to define a coupling position opposite to that in FIG. 3;

FIG. 10 shows a schematic representation of an illustrative use of the clutch of the first embodiment shown in FIGS.

Figure 12:
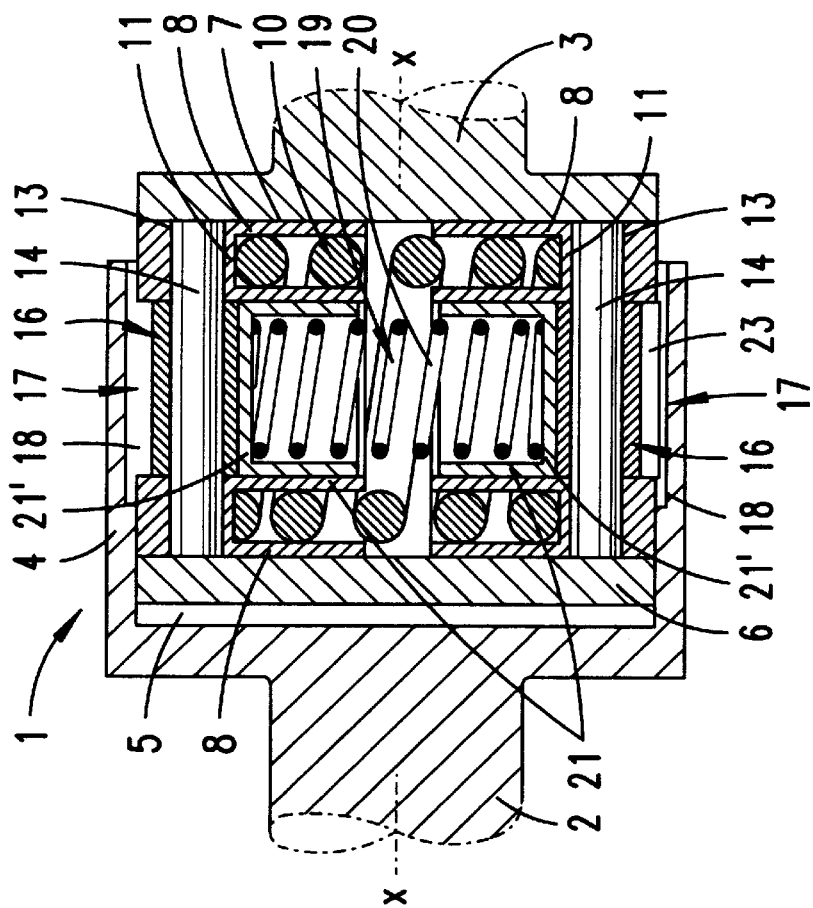
Figure 11:
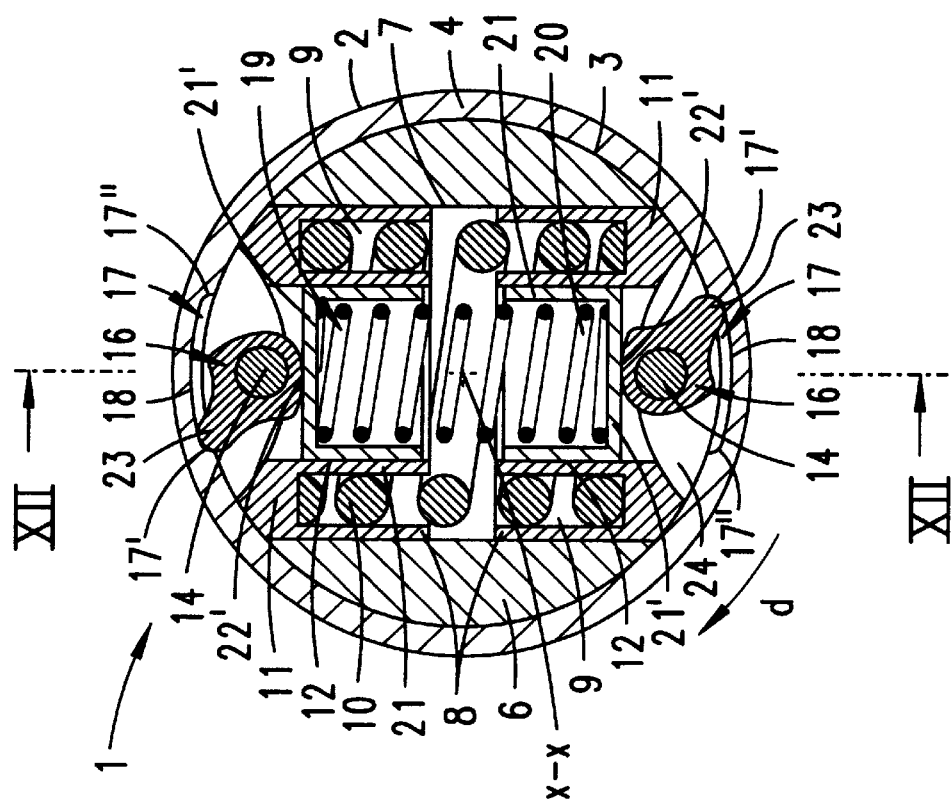
Figure 14:
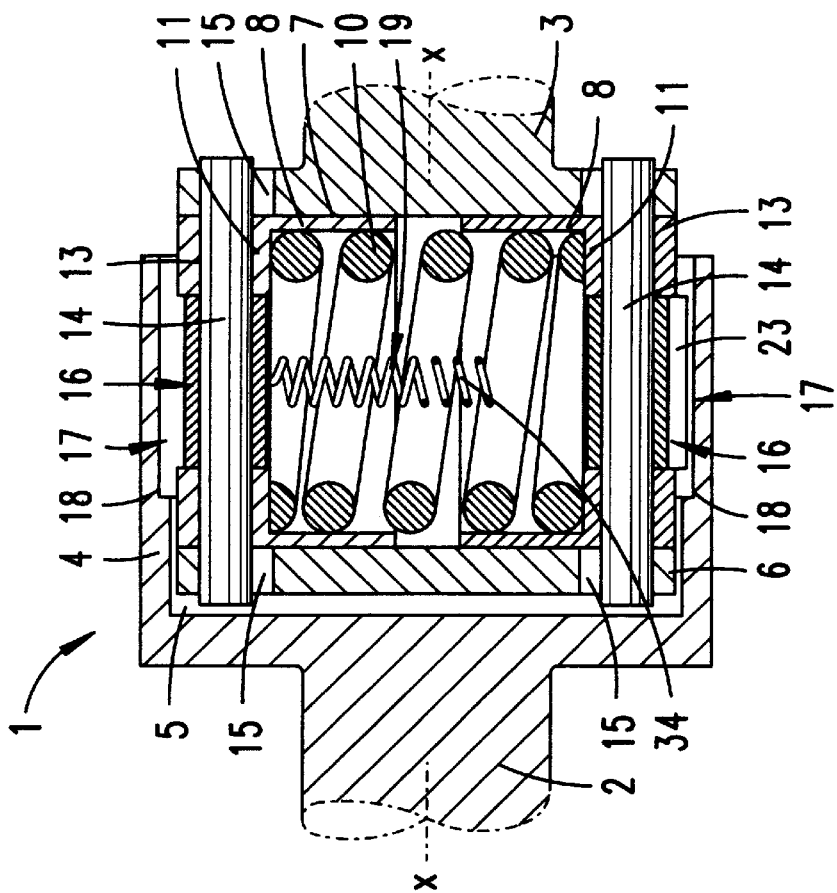
Figure 13:
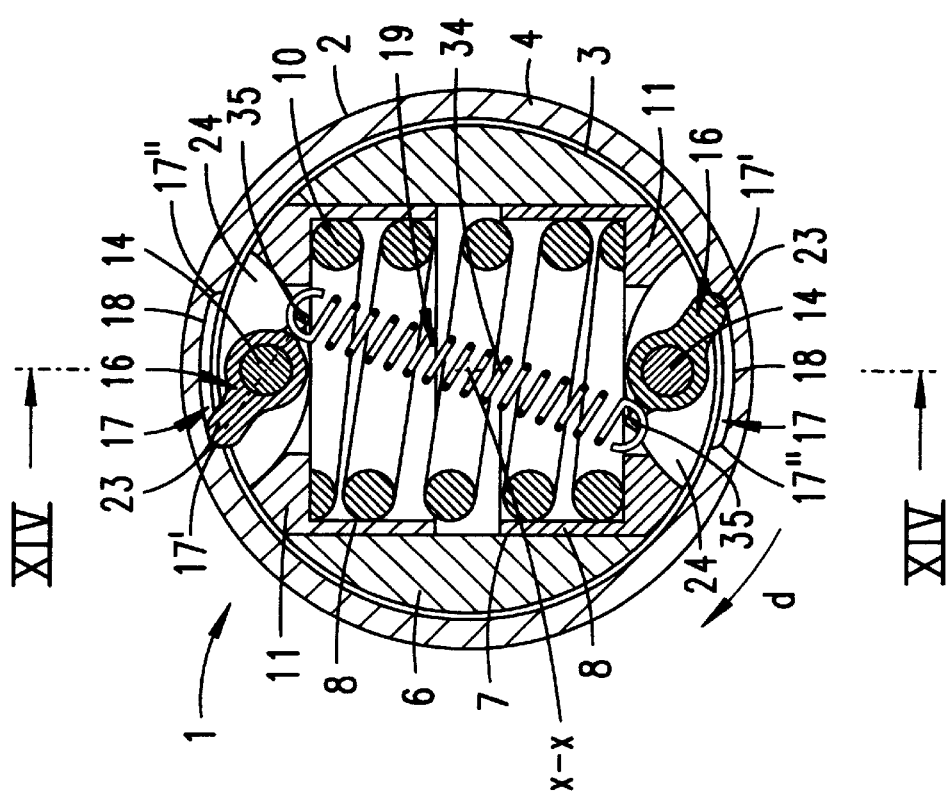
Figure 15:
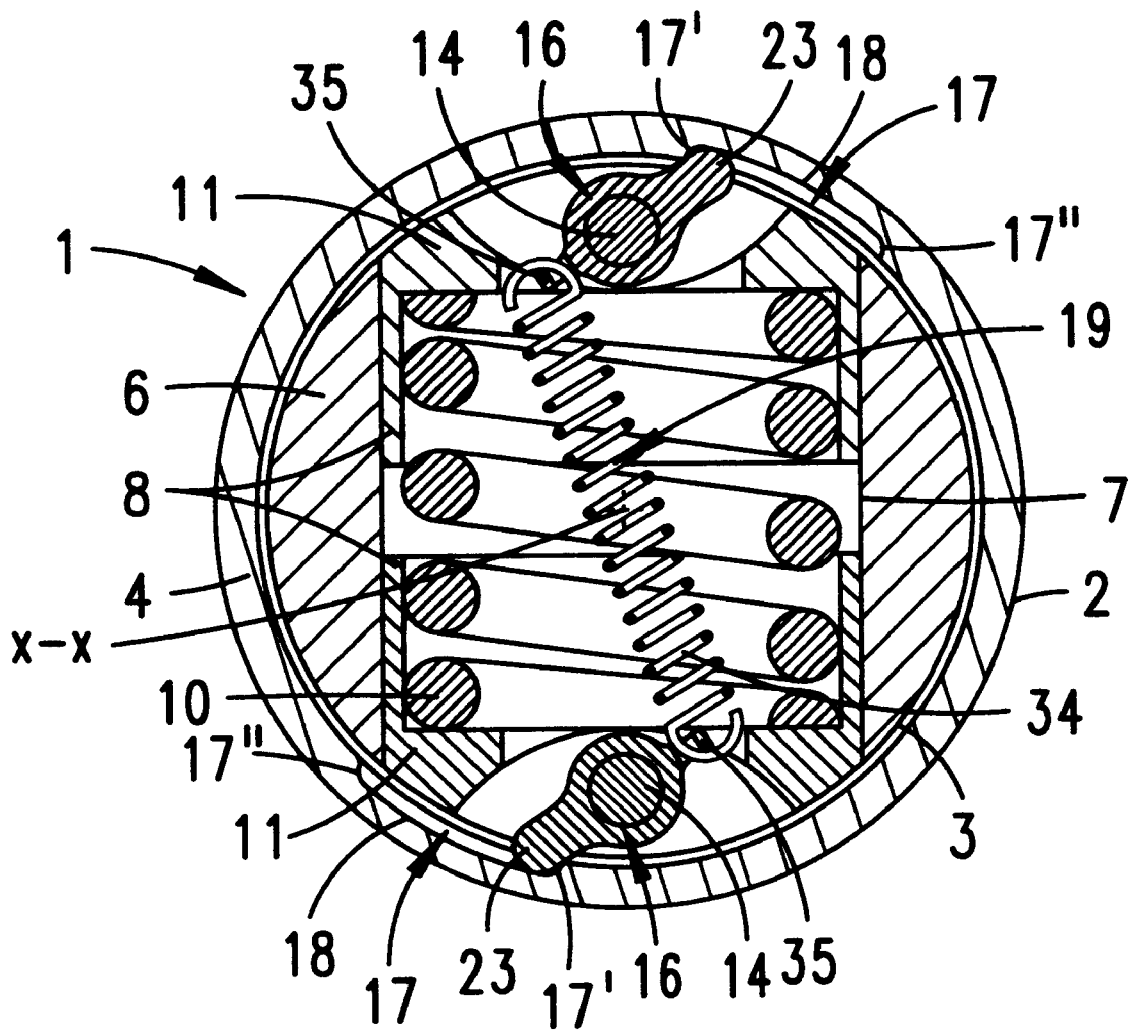

1–9, this clutch being incorporated into a drive train of an electromechanical press tool;

FIG. 11 shows a second embodiment of the clutch in a sectional representation in accordance with FIG. 3;

FIG. 12 shows the section along the line XII—XII in FIG. 11;

FIG. 13 shows a representation corresponding to FIG. 3, but relating to a third embodiment;

FIG. 14 shows the section along the line XIV—XIV in FIG. 13;

FIG. 15 shows a representation corresponding to FIG. 7, but relating to the embodiment shown in FIG. 13;

FIG. 16 shows a fourth embodiment of the clutch in a coupling position as shown in FIG. 3;

FIG. 17 shows a representation corresponding to FIG. 7, but relating to the embodiment shown in FIG. 16;

FIG. 18 shows a representation corresponding to FIG. 16, but relating to a further embodiment;

FIG. 19 shows a representation corresponding to FIG. 17, but relating to the fifth embodiment shown in FIG. 18.

DETAILED DESCRIPTION OF THE DRAWINGS

A torque-switched clutch 1 between an input shaft 2 and an output shaft 3 is first of all illustrated and described with reference to FIG. 1. FIGS. 1–10 show a first embodiment of the clutch 1.

In the region of the clutch, the input shaft 2 enters a cup-like input clutch section 4 of enlarged diameter. The latter has a receiving space 5 which is of circular cross-section and is open towards the output shaft 3. A thickened output clutch section 6 of circular cross-section is mounted in this space. The output shaft 3 is accordingly arranged concentrically with the input shaft 2 in the region of the clutch, both shafts 2 and 3 being rotatable about a common shaft axis x—x.

In the region of the output clutch section 6, the output shaft 3 has a transverse hole 7 aligned perpendicularly to the shaft axis x—x. This transverse hole 7 is formed as a through hole for the reception of two cup elements 8 oriented in opposite directions.

In the exemplary embodiment shown, these cup elements 8 are of double-walled design in order to form respective annular receptacles 9, each open towards one end of the cup element 8. The arrangement of the cup elements 8 in the transverse hole 7 is such that the annular openings at the ends of the receptacles 9 lie opposite one another. The length of each cup element 8, measured in the axial direction of the transverse hole 7, corresponds to less than half the length of the transverse hole 7, so that, starting from an initial position in accordance with FIG. 4, there remains a free space between the mutually facing ends of the cup elements 8.

Arranged in the receptacles 9 is a compression spring 10 which is supported at both ends on cup tops 11 of the cup elements 8, both cup elements 8 thus being preloaded radially outwards in relation to the shaft axis x—x. Both cup elements 8 have holes 12, which are each aligned co-axially with them and are bounded as regards their diameter by the inner wall of the double-walled receptacle 9. These holes 12 are formed to run continuously through the entire length of each cup element.

Provided in the region of the cup tops 11 are further receiving holes 13, which are aligned perpendicular to the axis of the cup elements and are designed to receive a pivot 14. The latter thus extends parallel to the shaft axis x—x and projects beyond the cup elements 8 on both sides, these projecting sections of the pivot 14 being guided in correspondingly shaped slotted holes 15 in the output clutch section 6. This provides a stop limitation for the cup elements 8, which are subjected to a force in the radially outward direction by the compression spring 10. The pivot 14, which is connected to a cup element 8, is supported in the region of the slotted holes 15 against the radially outer wall of the slotted holes of the clutch section 6. In this outermost position, the cup elements 8 continue to be spaced apart from the inner wall of the input clutch section 4 (see FIG. 4).

Mounted on each pivot 14, in the region of the through hole in the cup element 8, is a latch-like positive-locking element 16. The latter is similar to a finger in the cross-section of FIG. 3 but, in the longitudinal view shown in FIG. 4, resembles an elongated rectangular prism. This positive-locking element 16 interacts with a positive-locking receiver 17 of the input shaft 2 in the region of clutch section 4 of the latter. This positive-locking receiver 17 is defined by a groove 18, which is formed to extend substantially parallel to the shaft axis x—x. The depth of the groove 18, viewed parallel to the direction x—x of the shaft, is greater in the exemplary embodiment shown than the extent of the positive-locking element 16 when viewed in the same direction. From the cross-section in FIG. 3, it can be seen that the groove 18 has the cross-section of a segment of a circle, the geometrical centre being located on the shaft axis x—x. In the exemplary embodiment shown, the groove 18 is furthermore provided with an open edge in the direction of the free end of the output clutch section 6.

Provided in the output shaft 3, in the region of its clutch section 6, is a spring element 19 in the form of a second compression spring 20. The latter is arranged coaxially with the first compression spring 10, in the region of the holes 12 in the cup elements 8, and likewise acts radially outwards in the direction of the positive-locking elements 16, in relation to the shaft axis x—x. The compression spring 20 is surrounded on both sides at the ends by second cup elements 21. The compression spring 20 acts on the rear sides of the positive-locking elements 16 via the respective cup tops 21' to provide reliable engagement of the said elements in the positive-locking recesses 17. The second cup elements 21 surrounding the compression spring 20 at the end are arranged in such a way that they can be moved independently of and relative to the first cup elements 8 and the compression spring 10 enclosed by the latter.

Each positive-locking element 16 has a cross-sectional shape which is made up substantially of a sleeve 22 which surrounds the pivot 14 and of a finger-like latch 23 which points radially outwards.

The peripheral surface of the rear side 22' of the positive-locking element in the region of the sleeve 22 has a shape which emulates a logarithmic spiral. The compressive force acting on this rear side 22' produces a slight torque on the positive-locking element 16 for the radial alignment of the latter. The inner compression spring 20 here serves exclusively for the radial alignment of the positive-locking elements 16 in order to ensure that these engage with certainty in the positive-locking receivers 17 upon rotation of the input shaft 2 in the direction of torque transmission. This springing has a negligible effect on the magnitude of the disengagement torque. The force of the main compression spring 10 is reinforced only to a small extent.

In order to ensure that the positive-locking elements 16 can pivot freely, pivoting spaces 24 are cut out from the end regions of the first cup elements 8, i.e. the end regions facing the positive-locking elements 16.

The configurations described above result in the following action: The clutch 1 connects the two shafts 2 and 3 in such a way that the latch-type positive-locking elements 16 described engage in the opposing groove-like positive-locking receivers 17 of the cup-shaped input clutch section 4. The said positive-locking elements are mounted on the pivots 14 in the cup elements 8, to which a force is applied. These piston-shaped cup elements 8 are guided in radially movable fashion in the transverse hole 7 of the output shaft 3 and are preloaded outwards by means of the compression spring 10. The pivots 14 are pushed into the outer end position of the slotted holes 15 due to the preloading force. For the radial springing of the positive-locking elements 16, the compression spring 20 acts via the second cup elements 21 on the rear sides 22' of the positive-locking elements 16 in such a way that they are aligned radially outwards by the second cup elements 21 pressed against them by the compression spring 20.

FIG. 3 shows a positive-locking position during a rotation of the input shaft 2 in the clockwise direction (arrow d). In normal operation, i.e. at a load below a disengagement torque, which is directly dependent on the force exerted by the first compression spring 10, torque is transmitted in positive engagement by the engaged positive-locking elements 16. During rotation of the input shaft 2 in arrow direction d, the positive-locking elements 16 are supported by their latches 23 against a recess edge 17' in the region of the positive-locking recesses 17. The said edge thus takes the positive-locking element 16 along with it, bringing about concomitant rotation of the output shaft 3. Each positive-locking element 16 remains in the position shown in FIG. 3, since the force exerted by the compression spring 10 on the pivots 14 carrying the positive-locking elements 16 is greater than the radial component of the force transmitted by the positive-locking elements 16 or their latches 23. Under these circumstances, the output shaft 3 and the cup elements 8 mounted therein behave like a rigid component.

When the limiting torque is exceeded, the radial force component exceeds the compression-spring preload and, as a result, the positive-locking elements 16 mounted on the pivots 14 move radially inwards, taking along with them the first cup elements 8. The input shaft 2, which continues to rotate in arrow direction d, effects a displacement of the positive-locking elements 16, the sleeve 22 of each positive-locking element 16 effecting a slight compression of the second compression spring 20 via its second cup elements 21 in the course of pivoting.

FIGS. 5 and 6 show an intermediate position in the course of the release of the clutch 1 when the limiting torque is exceeded. In specific terms, they show a dead-centre position. As they are taken along further by the input shaft 2, the positive-locking elements 16 are displaced from this dead-centre position into a latch overrun position.

FIG. 7 shows the pivoted position of the positive-locking elements 16 which defines the overrun position. The positive-locking elements 16 are now in a freewheel position, the transmission of torque from the input shaft 2 to the output shaft 3 in the direction of rotation indicated by arrow d being interrupted. If the input shaft 2 is rotated further in arrow direction d as shown in FIG. 8, the positive-locking elements 16 are overrun in the manner of a ratchet.

From the release position of the clutch 1 shown in FIGS. 7 and 8, reverse rotation can take place, and, during this reverse rotation, the clutch 1 is reactivated. As can be seen from FIG. 9, the positive-locking element 16 is moved back into a positive-locking drive position relative to the positive-locking recess 17 if the input shaft 3 is rotated in arrow direction d' in the anticlockwise direction, a second recess edge 17" taking along the output shaft 3 via the positive-locking elements 16.

Also with this reversal of the direction of rotation, torque transmission takes place until the limiting torque determined by the first compression spring 10 is reached.

The disengagement torque is determined by the angle of incidence alpha and beta of the positive-locking elements 16 as the cup elements 8 begin to be deflected inwards against the compression spring 10. During the subsequent tilting movement of the positive-locking elements 16, the torque generally falls again immediately, since the angle of incidence decreases rapidly. Although the force of the already highly loaded compression spring 10 increases somewhat due to the inward deflection, the effect of the decreasing angle of incidence (division of the latch force into radial and tangential components) exceeds this effect.

In the exemplary embodiment shown, the angles of incidence alpha and beta mentioned are chosen so as to be of equal magnitude, this resulting in equal disengagement torques in both directions of rotation.

By virtue of the configurations described, the clutch 1 illustrated and described can be disengaged as a function of a limiting torque both in the case of anticlockwise and clockwise rotation of the shafts, with overrunning of the positive-locking elements 16 always being assured during rotation of the input shaft 2 counter to the direction of driving. The clutch 1 accordingly operates in the manner of a known ratchet spanner, although, when a limiting torque is exceeded, the shafts are separated in the event of further rotation of the input shaft 2.

The configuration according to the invention furthermore provides assurance that the workpiece to be drawn or pressed will always be subjected to the specified minimum torque or minimum pressing force. By virtue of the overrunning, in accordance with the invention, of the positive-locking elements 16, reverse rotation counter to the direction of driving rotation in positive-locking engagement before this minimum torque or pressing force is reached, is rendered impossible before the disengagement torque is reached.

A clutch 1 of this kind may be employed, for example, in the drive train of electromechanical press tools. A press tool 25 of this kind is illustrated schematically in FIG. 10. This substantially comprises an electric motor 26, a reduction gear unit 27, a spindle 28, a spindle nut 29 with a press insert 30 secured thereon, and a fixed press insert 32 secured on a frame 31. The press tool 25 illustrated serves, for example, for pressing cable lugs 31, illustrated schematically in FIG. 10, which are inserted between the press inserts 30 and 32, the latter being, for example, hexagonal, and are secured on electrical conductors by pressing the said inserts together. After reaching the required pressing force, force transmission must be interrupted in order to avoid overloading the machine or the connection. For this purpose, the clutch 1 according to the invention is located before the spindle 28, the clutch 1 limiting the pressing force by torque disengagement.

In addition to reliable disengagement, the clutch according to the invention fulfils another safety criterion in this application. Opening of the press tool, i.e. reverse rotation of the spindle 28, is possible only after the minimum pressing force has been reached, i.e. after the clutch 1 has been disengaged, since the clutch acts as a freewheel in the reverse direction before this minimum pressing force has been reached. This characteristic ensures that pressing cannot be ended prematurely. The pressing force corresponding to the disengagement torque is accordingly reached in every pressing operation.

For safety reasons, however, it may be necessary to reverse a pressing operation which has begun. This may be effected, for example, by means of an additional clutch (not shown), which can be activated by hand and bypasses the clutch 1 according to the invention, which is being operated in the freewheel direction.

However, this reversal facility may also be implemented within the clutch itself. One such solution is illustrated in the second exemplary embodiment in FIGS. 11 and 12.

Contrary to the first exemplary embodiment, in which the piston-like first cup elements 8 are spaced apart from the inner wall of the input shaft 2 or its clutch section 4 in every position, by virtue of the stop limitation of the pivots 14 in the slotted holes 15, the cup elements 8 in the second exemplary embodiment rest against the inside of the input clutch section 4. The shafts 14 of the positive-locking elements 16 extend only in the region of the cup elements 8 and do not, as in the first exemplary embodiment, extend into the output clutch section 6. Here, therefore, there is no stop limitation of the cup elements 8 by means of the shafts 14. At the contact points between the cup elements 8 and the inner wall of the clutch section 4, the preloading force of the compression spring 20 produces frictional forces which give rise to a residual friction torque even in the freewheeling position of the positive-locking elements 16. This residual friction torque makes it possible to reverse the rotation of, for example, a self-locking spindle below a particular pressing force.

Another exemplary embodiment of a clutch 1 is illustrated in FIGS. 13 to 15. Here, the spring element 19 acting on the positive-locking elements 16 for the radial alignment of the latter is formed as a tension spring 34.

The positive-locking elements 16 have finger-like holding lugs 35, which are arranged diametrically opposite the latches 23 and into which the tension spring 34 is hooked. By virtue of this arrangement, the tension spring 34 extends through the interior of the compression spring 10, the axis of the tension spring 34 assuming an acute angle to the axis of the compression spring 10 in the respective driving position of the positive-locking elements 16.

The tension spring 34 brings about a continuous preload on the positive-locking elements 16 in the radial direction towards the position not adopted. The tension spring 34 furthermore produces a slight torque for the radial alignment of the positive-locking elements 16.

FIGS. 16 and 17 furthermore show another embodiment, in which the preloading of the positive-locking elements 16 is performed, as in the first exemplary embodiment, by a compression spring 20 provided with second cup elements 21. In order to achieve different disengagement torques for the two directions of rotation in this case, the angles of incidence alpha' and beta' at the beginning of the inward deflection of the cup elements 8 against the compression spring 10 are here chosen so that they differ.

This is achieved in the exemplary embodiment shown by means of an asymmetrical cross-sectional configuration of the positive-locking receivers 17, the radial depth of each positive-locking receiver 17 increasing over its arcuate length, starting from a first recess edge 17'. The result of this is that, with the positive-locking element 16 supported against the second recess edge 17", the angle of incidence beta' which establishes itself in the course of a reverse rotation of the input shaft 2 (arrow direction d' in FIG. 17) is smaller than in the forward direction (angle of incidence alpha' during rotation in arrow direction d in FIG. 16), due to the greater radial depth chosen for the groove 18 in this region. This ensures, in a very simple way, a lower disengagement torque upon rotation in arrow direction d' or upon reverse rotation of the shaft 2 to reactivate the clutch 1.

This embodiment may be employed, for example, in the case of clutches 1 which are inserted as an intermediate part between a socket spanner and a socket-spanner attachment. In this context, it is possible, for example, to tighten a bolt or the like with a predetermined limiting torque, disengagement of the clutch 1 occurring once this limiting value has been exceeded. Once the limiting torque has been exceeded, the clutch disengages, resulting in separation of the input shaft 2 and the output shaft 3. The positive-locking elements 16 are in a latch overrun position. In order to reactivate the clutch, the output shaft may, for example, be held fast by means of the socket-spanner insert arranged on it, the positive-locking elements 16 being pivoted back into the original position by rotating the input shaft or the socket spanner arranged on the input shaft slightly backwards in arrow direction d'. The force required is relatively small due to the small angle of incidence of the positive-locking elements 16 in the release position.

As an alternative to the embodiment described, the different disengagement torques may also be achieved by appropriate, e.g. asymmetrical, shaping of the positive-locking elements 16.

Finally, FIGS. 18 and 19 illustrate an embodiment in which the preloading of a positive-locking element 16 is performed in accordance with the exemplary embodiment described above. In contrast to the above exemplary embodiments, however, only one positive-locking element 16 is provided in this embodiment. Accordingly, the clutch 1 also has just one first cup element 8 and one second cup element 21.

The arrangement chosen is furthermore such that the axis of the positive-locking element 16 is arranged offset radially relative to the axis y of the first and second cup elements 8 and 21 respectively.

The positive-locking receiver 17 has a substantially semi-circular cross-section with a radius which is chosen so as to be somewhat larger than that of the nose of the latch-type positive-locking element 16.

By means of the selected radially offset arrangement of the positive-locking element 16 relative to the axis y, different disengagement torques for the two directions of rotation (d and d') are achieved here too. Different angles of incidence alpha' and beta' are established at the beginning of the inward deflection of the cup element 8 against the compression spring 10, an angle alpha' of 60° to 65°, preferably 62.7°, and an angle beta' of 38° to 43°, preferably 41°, preferably being chosen here. The angle beta' may also be considerably smaller and be between, for example, 5° and 0° or even virtually 0°. If the peripheral angle offset of the pivot 14 relative to the central axis x—x is about 10°, for example, the angle beta' may be between about 0° and 20° or between 5° and 25°.

By virtue of the last-mentioned configuration, in particular, when the angle beta' is very small, a simple re-engagement of the clutch, by manual actuation for example, is made possible.

By means of this configuration, a simple re-engagement of the clutch, by manual actuation for example, is made possible.

In contrast to the exemplary embodiments described above, it is possible, in this embodiment, in which only one positive-locking element 16 is used in at least one plane, for the preloading force of the first compression spring 10 to be adjusted. For this purpose, an adjusting screw 40, which forms the bottom-end support for the compression spring 10, is provided. The said adjusting screw is seated in a threaded hole in the output clutch section 6 and can here be moved along the axis y by means of a thread, thereby making it possible to increase or reduce the preloading force of the first compression spring 10.

A hexagonal recess 41 is provided for the adjustment of the adjusting screw 40 in this exemplary embodiment.

Different disengagement torques may be preset by adjusting the preloading force of the first compression spring 10. This adjustment is preferably performed at the factory before the output shaft 3 is coupled to the input shaft 2. The adjusting screw 40 is of self-locking design, so that the selected presetting is retained. Plastic deformation of the thread region, for example by centre punching, is also conceivable here.

In the assembled state of the clutch 1, i.e. in the operating state, the adjusting screw 40 is covered by the input clutch section 4 of the input shaft 2.

As an alternative, provision may be made for the input clutch section 4 which substantially covers the adjusting screw 40 to have a window-like cutout to allow adjustment of the preload of the first compression spring 10 by the user. By means of this cutout, it is then an extremely simple matter for the user to rotate the adjusting screw 40 to achieve the desired disengagement torque.

Irrespective of the illustrated and described embodiments of the clutch 1, it is essential that the positive-locking element is of latch-type design and arranged so as to be rotatable relative to the output shaft 3 for movement between a latch locking position and a latch overrun position. It is of no consequence here whether the positive-locking elements 16 are located in the output shaft 3 and the positive-locking recesses 17 are located in the input shaft 2 or whether an inverse arrangement is provided. It is furthermore also conceivable, instead of the illustrated radial alignment of the positive-locking elements 16 and of the positive-locking recesses 17, to provide an axial alignment. In this arrangement, the positive-locking elements 16 are, for example, provided at the end of the output shaft 3 for interaction with positive-locking recesses 17, likewise provided at the end in the input clutch section 4 associated with the output shaft 3. The force applied to the positive-locking elements 16 is accordingly likewise aligned axially.

A further essential point is that the positive-locking elements 16 assume the release position in such a way that it is maintained even if there is a torque failure and that the positive-locking elements interact at all events in a substantially torque-free manner with the mating shaft in the release position.

The piston-like first cup elements 8 may, for example, also be preloaded radially outwards in the direction of the positive-locking elements 16 by hydraulic means. For this purpose, the said positive-locking elements are sealed off relative to the transverse hole 7 in the output shaft 3 and pressurized from the inside by means of oil pressure. This provides a simple means of adjusting the disengagement torque by varying the oil pressure.

In the exemplary embodiments shown, the groove 18 forming a positive-locking recess is matched in the circumferential direction to the pivoting angle of the positive-locking element. However, it is also possible to conceive of embodiments in which the groove is made larger or smaller in the circumferential direction than in the exemplary embodiments shown. It is further possible to conceive of embodiments in which a number of pairs of positive-locking elements 16 are provided. These may be arranged in series in the axial direction, these pairs of positive-locking elements either being acted upon by way of a common energy accumulator or by way of separate energy accumulators.

It is furthermore conceivable to re-establish the latch locking position (coupling position) by axial displacement of the outer input clutch section 4. In the course of this displacement, the positive-locking receiver 17 leaves the region of the positive-locking element 16, which, after completion of the displacement, engages in a groove-like region of enlarged radial depth. This depth is made such that a spring-assisted pivoting back of the positive-locking element is effected into a position in which it is directed radially outwards relative to the shaft axis x—x and has an angle of incidence of 0 degrees. By virtue of the fact that the disengagement torque approaches zero in this position, the user can move the positive-locking element 16 back into the original pivoted position by slight reverse rotation. After the outer clutch section 4 has been moved back axially, the clutch is in the coupling position once more.

In a development of this idea, it is also possible to set different disengagement torques. For this purpose, a plurality of positive-locking receivers is arranged in series in the axial direction, the receivers having an increasing radial depth. A lesser or greater angle of incidence of the positive-locking element is established as a function of this depth, depending on the positive-locking receiver selected, and this angle of incidence determines the disengagement torque. Instead of a plurality of positive-locking receivers in series for the stepwise adjustment of the disengagement torque, it is also possible to provide just one positive-locking receiver with a radial depth which increases in the axial direction. Continuously variable torque adjustment is thereby possible.

A significant advantage of the clutch 1 described in the various embodiments is that the disengagement torque depends only on the preloading force of, for example, a compression spring and geometrical variables. This makes it possible to comply more precisely with the disengagement torque than is possible with the known slipping clutches, owing to the severe fluctuations in the friction coefficients.

All the features disclosed are relevant to the invention. The disclosure content of the associated/attached priority documents (copy of the prior application) is thus incorporated fully in the disclosure of the application, with the intention also of including features of these documents in claims of the present application.

I claim:

1. A torque-switched clutch between an input shaft and an output shaft, which transfers into a release position from a positive-locking connection when a limiting torque is reached, the clutch comprising at least one positive-locking element, which is connected to one shaft and interacts with a positive-locking receiver of the other shaft, the positive-locking element being movable out of a coupling position into a release position in a non-destructive manner, wherein the positive-locking element is arranged so as to be rotatable relative to the one shaft, wherein the positive-locking element is configured to move by both an anticlockwise and clockwise rotation of the shafts when the limiting torque is exceeded from a latch locking position to a latch overrun position and in the latch overrun position a torque transmission is produced by a reversal of the direction of rotation until a limiting torque has been reach.

2. A clutch according to claim 1, wherein the positive-locking element assumes the release position in such a way that the release position is maintained even in the case of failure of the torque and, in the release position, the positive-locking element interacts with the other shaft in a manner at least substantially free from torque.

3. A clutch according to claim 1, wherein the positive-locking element is provided on the output shaft.

4. A clutch according to claim 3, wherein the positive-locking element is arranged in the output shaft in such a way as to be able to yield radially inwards against a releasable applied force.

5. A clutch according to claim 4, wherein the applied force is provided by a preloaded first compression spring.

6. A clutch according to claim 5, wherein the preloading force of the first compression spring is adjustable.

7. A clutch according to claim 6, wherein adjustment of the preloading force of the first compression spring is effected by means of an adjusting screw.

8. A clutch according to claim 1, wherein two positive-locking elements arranged opposite one another are provided.

9. A clutch according to claim 3, wherein a separate spring element, which acts on the positive-locking element, is provided in the one shaft.

10. A clutch according to claim 9, wherein the separate spring element is a tension spring, the spring force effecting at all times a preload on the positive-locking element towards the position of the positive-locking element which has not been adopted.

11. A clutch according to claim 9, wherein the separate spring element is formed by a second compression spring acting substantially radially outwards on the positive-locking element.

12. A clutch according to claim 3, wherein the positive-locking element is connected to a first cup element, which can be displaced in the output shaft substantially perpendicular to the shaft axis, an element for applying a force to the positive-locking element being accommodated in the interior of the cup.

13. A clutch according to claim 12, wherein the positive-locking element is arranged outside a cup top in relation to the force-applying element.

14. A clutch according to claim 12, wherein a spring element is arranged substantially concentric with a first compression spring, the first compression spring effecting the application of said force to the positive-locking element.

15. A clutch according to claim 14, wherein a second compression spring is provided in a further, second cup element.

16. A clutch according to claim 15, wherein the first and the second cup element are arranged concentrically, the second cup element being displaceable in the radial direction relative to the first cup element.

17. A clutch according to claim 15, wherein the positive-locking element is arranged radially offset relative to the axis of the second cup element.

18. A clutch according to claim 12, comprising two first cup elements oriented in opposite directions.

19. A clutch according to claim 1, further comprising structure configured to provide that radial deflection travel of the positive-locking element is stop-limited.

20. A clutch according to claim 1, wherein the output shaft is arranged concentrically with the input shaft in the region of the clutch.

21. A clutch according to claim 1, wherein the input shaft has a positive-locking recess facing the output shaft.

22. A clutch according to claim 21, wherein a separate spring element effects a radial preload on the positive-locking element for engagement in the positive-locking recess.

23. A clutch according to claim 21, wherein the positive-locking recess is is at least partially defined by a groove.

24. A clutch according to claim 23, wherein the groove of the positive-locking recess is larger in the axial direction of the shaft than the extent of the positive-locking element.

25. A clutch according to claim 23, wherein the groove of the positive-locking recess is matched in the circumferential direction to the pivoting angle of the positive-locking element.

26. A clutch according to claim 1, wherein the positive-locking element can be moved relative to the one and the other shaft.

27. A clutch according to claim 1, wherein the positive-locking element is arranged rotatably on a pivot for rotation from the latch locking position into the latch overrun position.

28. A clutch according to claim 27, wherein the pivot extends substantially parallel to the shaft axis.

29. A clutch according to claim 1, wherein an outer wall of the output shaft is spaced apart from an inner wall of the input shaft in the region of the clutch, in every position of the positive-locking element.

30. A clutch according to claim 1, wherein a radially outer stop for the positive-locking element is formed by support of the outer wall of the output shaft against an inner wall of the input shaft in the region of the clutch.

31. A clutch according to claim 1, wherein an angle of incidence (alpha') of the positive-locking element is greater in a first position than an angle of incidence (beta') in a second position.

32. A torque-switch clutch between an input shaft and an output shaft, which transfers into a release position from a positive-locking connection when a limiting torque is reached, the clutch comprising two positive-locking elements, each of which is pivotably mounted on the output shaft for movement between a latch locking position and a latch overrun position, and interacts with a respective positive-locking recess provided on the input shaft, each positive locking element being mounted on a respective cup element which is displaceable in the output shaft in a direction substantially perpendicular to the shaft axis, and the cup elements being urged radially outwards of the output shaft by resilient means, so that each positive-locking element is movable against a force exerted by said resilient means out of a coupling position into a release position in a non-destructive manner, wherein the positive-locking element are configured to move by both an anticlockwise and clockwise rotation of the shaft when the limiting torque is exceeded from a latch locking position to a latch overrun position and in the latch overrun position a torque transmission is produced by a reversal of the direction of rotation until a limiting torque has been reached.

33. A torque-switched clutch between an input shaft and an output shaft, which transfers into a release position from a positive-locking connection when a limiting torque is reached, the clutch comprising at least one positive-locking element, which is connected to output shaft and interacts with a positive-locking receiver of the input shaft, the positive-locking element being movable out of a coupling position into a release position in a non-destructive manner, wherein the positive-locking element is arranged so as to be rotatable relative to the input shaft for movement between a latch locking position and a latch overrun position, wherein the positive-locking element is connected to a first cup element, which can be displaced in the output shaft substantially perpendicular to the shaft axis, an element for applying a force to the positive-locking element being accommodated in the interior of the cup, wherein a spring element is arranged substantially concentric with a first compression spring, the first compression spring effecting the application of said force to the positive-locking element.

34. A clutch according to claim 33, wherein a second compression spring is provided in a further, second cup element.

35. A clutch according to claim 34, wherein the first and the second cup elements are arranged concentrically, the second cup element being displaceable in the radial direction relative to the first cup element.

* * * * *